(12) United States Patent
Jeon

(10) Patent No.: US 7,512,963 B2
(45) Date of Patent: Mar. 31, 2009

(54) INTELLIGENT LOW-NOISE BLOCK DOWN-CONVERTER

(75) Inventor: Dong Won Jeon, Seoul (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 867 days.

(21) Appl. No.: 10/996,092

(22) Filed: Nov. 24, 2004

(65) Prior Publication Data
US 2005/0289605 A1 Dec. 29, 2005

(30) Foreign Application Priority Data
Jun. 28, 2004 (KR) ............ 10-2004-0049053

(51) Int. Cl.
*H04N 7/20* (2006.01)
*G06F 3/033* (2006.01)
*H03D 7/16* (2006.01)

(52) U.S. Cl. ............ 725/68; 725/25; 725/26; 725/63; 455/130; 455/131

(58) Field of Classification Search ............ 725/62–72, 725/25–26, 31, 143, 146, 149, 151, 152, 725/153; 455/130, 131, 132, 3.02; 348/E7.093
See application file for complete search history.

(56) References Cited

U.S. PATENT DOCUMENTS 5,689,176 A * 11/1997 Deloy .................. 323/222
6,600,730 B1 * 7/2003 Davis et al. ............ 725/68
2005/0099282 A1 * 5/2005 Taguchi et al. .......... 340/445

FOREIGN PATENT DOCUMENTS

WO   WO 2004071086 A1 *  8/2004

* cited by examiner

*Primary Examiner*—Christopher Kelley
*Assistant Examiner*—Randy Flynn
(74) *Attorney, Agent, or Firm*—Lowe Hauptman Ham & Berner

(57) ABSTRACT

Disclosed herein is an intelligent low-noise block down-converter (LNB) which is implemented to, only when an LNB ID contained therein is the same as an ID of a satellite receiver connected therewith, provide a down-converted signal (IF signal) to the satellite receiver, thereby making it possible to more securely prevent an ID card of the satellite receiver and/or a pay broadcast program from being duplicated.

3 Claims, 2 Drawing Sheets

Satellite antenna

Satellite receiver

INTELLIGENT LOW-NOISE BLOCK DOWN-CONVERTER

RELATED APPLICATIONS

The present application is based on, and claims priority from, Korean Application Number 2004-49053, filed Jun. 28, 2004, the disclosure of which is incorporated by reference herein in its entirety.

BACKGROUND OF THE INVENTION

1. Field of the Invention

The present invention relates to a low-noise block down-converter (LNB) which is applied to a satellite broadcast receiving system, and more particularly to an intelligent LNB which is implemented to, only when an LNB identification (ID) contained therein is the same as an ID of a satellite receiver connected therewith, provide a down-converted signal (intermediate frequency (IF) signal) to the satellite receiver, thereby making it possible to more securely prevent an ID card of the satellite receiver and/or a pay broadcast program from being duplicated.

2. Description of the Related Art

In general, an LNB is adapted to down-convert the frequency (about 10 GHz) of a satellite signal from a satellite antenna to a frequency (about 1 to 2 GHz) processable by a satellite receiver connected therewith. The satellite receiver functions to select a desired channel contained in an output signal from the LNB so that a user can view the selected channel.

FIG. 1 is a schematic view of a conventional LNB.

As shown in FIG. 1, the conventional LNB comprises a low-noise amplifier 11 for low-noise amplifying a satellite signal from a satellite antenna, a frequency converter 12 for down-converting the frequency (e.g., 10 GHz) of the satellite signal low-noise amplified by the low-noise amplifier 11 to a frequency (e.g., 950 MHz to 2150 MHz) processable by a satellite receiver and outputting the resulting IF signal, and an IF amplifier 13 for amplifying the IF signal from the frequency converter 12 to a level processable by the satellite receiver.

Meanwhile, a satellite broadcast includes a pay channel that a user can view only once a subscription fee has been paid. In order to view such a pay channel, the user has to pay a satellite broadcast provider a subscription fee for the pay channel in advance. Upon receipt of the subscription fee, the satellite broadcast provider allocates the user a specific code that enables the user to view the pay channel. Then, the user can view the pay channel through the satellite receiver using the specific code.

The specific code can be allocated in two methods, a keying method and an ID card method. The keying method is to key and store the specific code in the satellite receiver in advance. In this method, the satellite receiver reads the specific code stored therein so that the user can view the pay channel.

The ID card method is to insert, into the satellite receiver, an ID card having the specific code stored therein. In this method, the satellite receiver reads the specific code stored in the ID card inserted therein so that the user can view the pay channel.

The ID card method, of the above two methods, is more widely used than the keying method in that it provides greater convenience of use.

However, the ID card may be duplicated. In this case, the user may view the pay channel through the satellite receiver using the duplicated ID card, resulting in a duplication of a costly pay broadcast program without permission.

For this reason, in consideration of the fact that the ID card may be duplicated without permission, special security measures must be taken for the pay channel.

SUMMARY OF THE INVENTION

Therefore, the present invention has been made in view of the above problems, and it is an object of the present invention to provide an intelligent LNB which is implemented to, only when an LNB ID contained therein is the same as an ID of a satellite receiver connected therewith, provide a down-converted signal (IF signal) to the satellite receiver, thereby making it possible to more securely prevent an ID card of the satellite receiver and/or a pay broadcast program from being duplicated.

In accordance with the present invention, the above and other objects can be accomplished by the provision of an intelligent low-noise block down-converter (LNB) connected between a satellite antenna and a satellite receiver, comprising: a voltage regulator for generating an operating voltage on the basis of a voltage from the satellite receiver and supplying the generated voltage to each part of the LNB; frequency conversion means for down-converting the frequency of a satellite signal from the satellite antenna to a intermediate frequency (IF) signal processable by the satellite receiver; an identification (ID) memory for storing an LNB ID that is the same as a receiver ID stored in the satellite receiver; an ID receiver for receiving the receiver ID from the satellite receiver; a processor for comparing the LNB ID stored in the ID memory with the receiver ID received by the ID receiver to determine whether the two IDs are the same; a switching controller for outputting a switch-on signal if the LNB ID and the receiver ID are determined to be the same by the processor, and a switch-off signal if the LNB ID and the receiver ID are determined not to be the same by the processor; and switching means for switching on or off the output of the IF signal from the frequency conversion means in response to the switch-on signal or switch-off signal from the switching controller.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
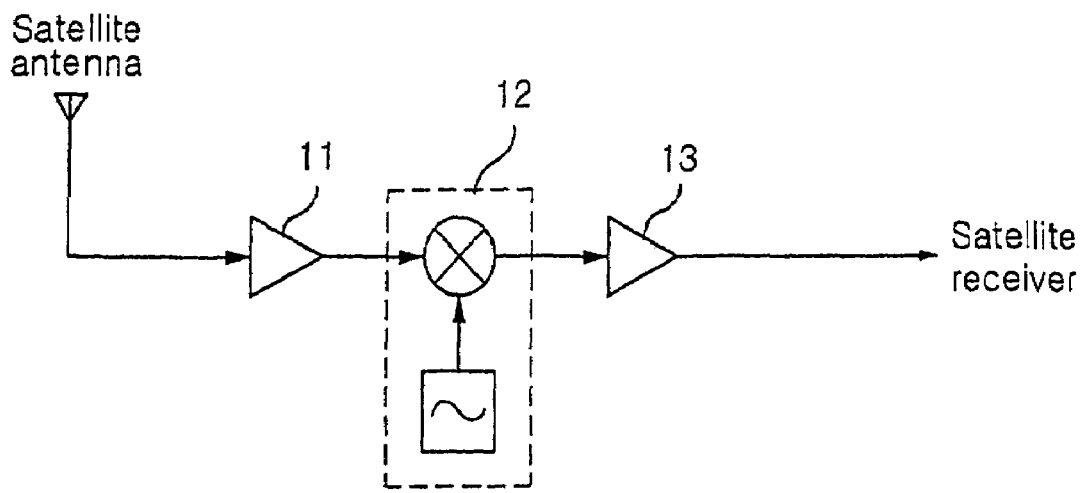
FIG. 1 is a schematic view of a conventional LNB.
Figure 2:
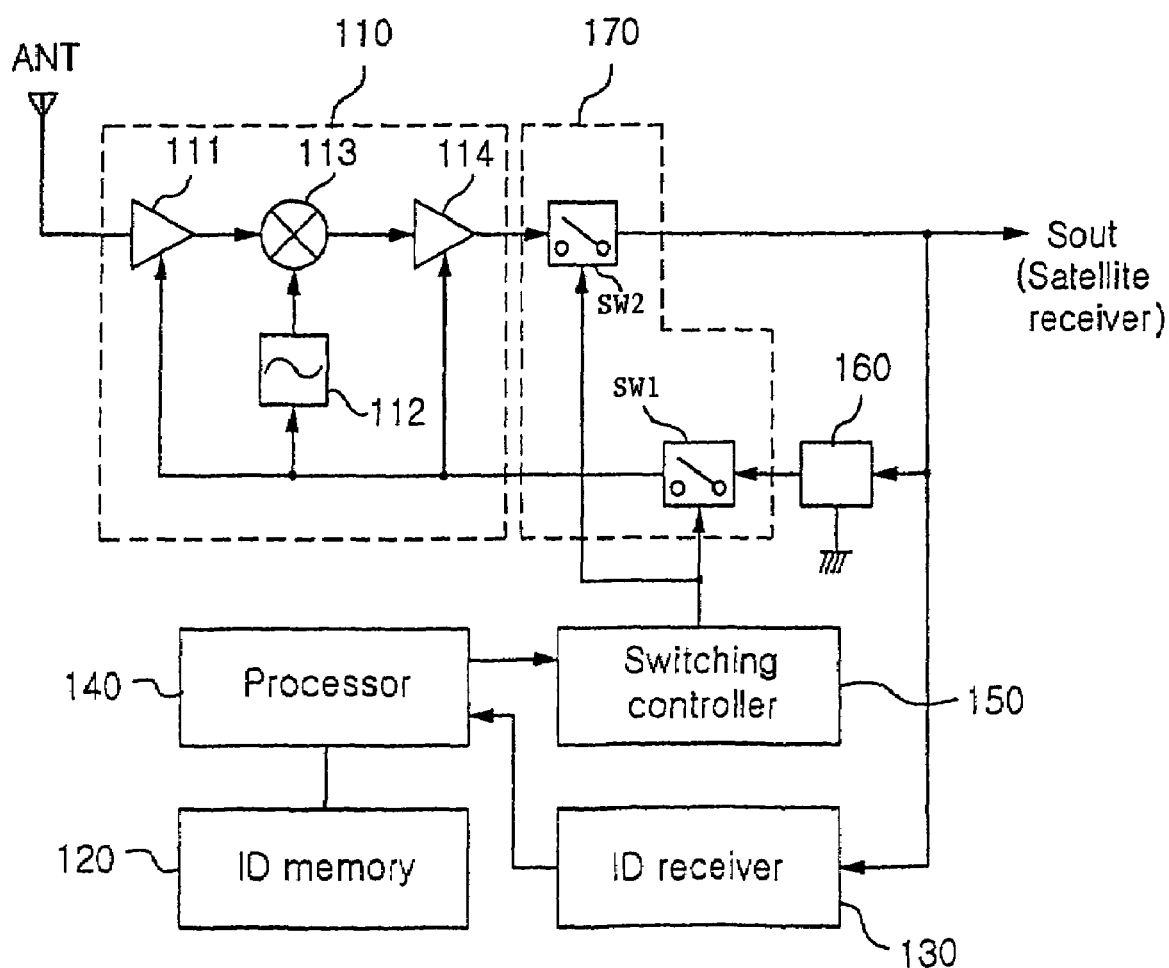
FIG. 2 is a block diagram showing the configuration of an intelligent LNB according to the present invention.

FIG. 2 shows the configuration of an intelligent LNB according to the present invention.

With reference to FIG. 2, the intelligent LNB according to the present invention is connected between a satellite antenna ANT and a satellite receiver, and comprises a voltage regulator 160 for generating an operating voltage on the basis of a voltage from the satellite receiver and supplying the generated voltage to each part of the LNB, a frequency converter 110 for down-converting the frequency of a satellite signal from the satellite antenna ANT to a IF signal processable by the satellite receiver, and an ID memory 120 for storing an LNB ID ID2 that is the same as a receiver ID ID1 stored in the satellite receiver. The LNB further comprises an ID receiver 130 for receiving the receiver ID ID1 from the satellite receiver, a processor 140 for comparing the LNB ID ID2 stored in the ID memory 120 with the receiver ID ID1 received by the ID receiver 130 to determine whether the two IDs ID1 and ID2 are the same, a switching controller 150 for outputting a switch-on signal if the two IDs ID1 and ID2 are determined to be the same by the processor 140, and a switch-off signal if the two IDs ID1 and ID2 are determined not to be the same by the processor 140, and a switching device 170 for switching on or off the output of the IF signal from the frequency converter 110 in response to the switch-on signal or switch-off signal from the switching controller 150.

Preferably, the LNB ID of the present invention is stored in the ID memory 120 in the process of production or selling thereof in such a manner that it cannot be changed by a user.

The term 'intelligent', of the intelligent LNB, signifies that the LNB can determine by itself whether to output the IF signal to the satellite receiver according to whether the LNB ID and the receiver ID are the same.

Preferably, the receiver ID is softwarily recognized by a program of the satellite receiver in the process of production or selling thereof. Alternatively, the receiver ID may be hardwarily stored in a hard key or an ID card (or CAS card) for viewing of a pay broadcast program in the process of production or selling of the satellite receiver, and then used when the hard key or ID card is inserted into a socket of the satellite receiver.

The frequency converter 110 includes a low-noise amplifier 111 for low-noise amplifying the satellite signal from the satellite antenna ANT, an oscillator 112 for generating a predetermined oscillation frequency, a mixer 113 for mixing the frequency of the satellite signal low-noise amplified by the low-noise amplifier 111 with the oscillation frequency from the oscillator 112 to down-convert it to the frequency processable by the satellite receiver, and outputting the resulting IF signal, and an IF amplifier 114 for amplifying the IF signal from the mixer 113 at a predetermined gain.

Preferably, the switching device 170 is composed of a power switch SW1 connected to an output terminal of the voltage regulator 160 for switching on or off the supply of the operating voltage from the voltage regulator 160 in response to the switch-on signal or switch-off signal from the switching controller 150.

Alternatively, the switching device 170 may be composed of a signal switch SW2 connected to an output terminal of the frequency converter 110 for switching on or off the output of the IF signal from the frequency converter 110 in response to the switch-on signal or switch-off signal from the switching controller 150.

Alternatively, the switching device 170 may include a power switch SW1 connected to an output terminal of the voltage regulator 160 for switching on or off the supply of the operating voltage from the voltage regulator 160 in response to the switch-on signal or switch-off signal from the switching controller 150, and a signal switch SW2 connected to an output terminal of the frequency converter 110 for switching on or off the output of the IF signal from the frequency converter 110 in response to the switch-on signal or switch-off signal from the switching controller 150.

Next, a detailed description will be given of the operation of the intelligent LNB with the above-stated configuration according to the present invention in conjunction with the annexed drawings.

Figure 3:
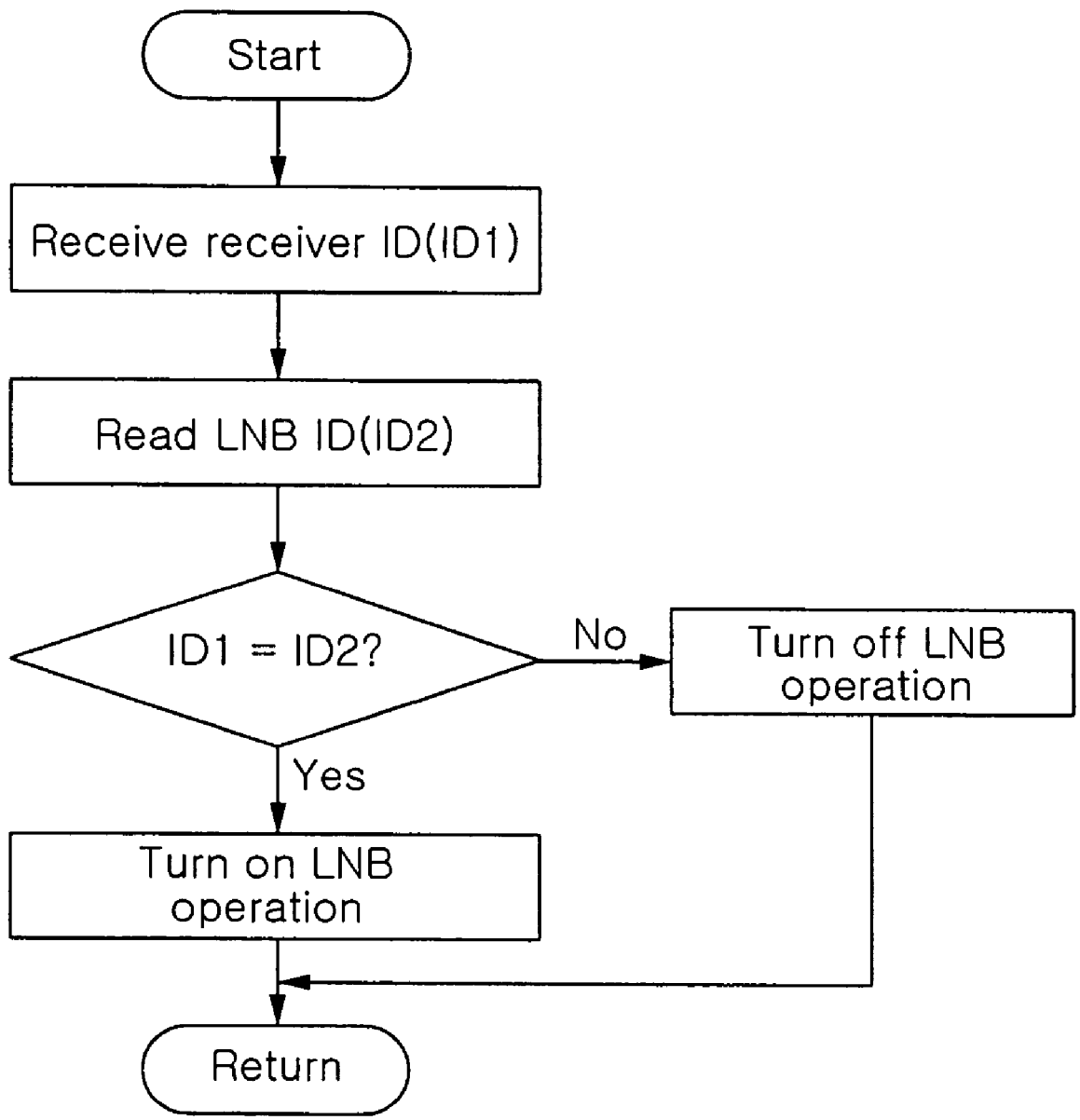
FIG. 3 is a flow chart illustrating the operation of the intelligent LNB according to the present invention.

With reference to FIGS. 2 and 3, under the condition that the LNB is connected between the satellite antenna ANT and the satellite receiver, an integrated receiving decoder (IRD) of the satellite receiver transmits the receiver ID ID1 stored therein to the LNB upon power-on of the receiver.

Then, the ID receiver 130 of the LNB of the present invention receives the receiver ID ID1 from the satellite receiver, created in, for example, a 'DiSEqC' format, converts the DiSEqC format of the received receiver ID ID1 into a data stream format, and sends the resulting receiver ID ID1 to the processor 140. Then, the processor 140 reads the LNB ID ID2 from the ID memory 120, and compares the read LNB ID ID2 with the receiver ID ID1 from the ID receiver 130 to determine whether they are the same. This operation of the LNB of the present invention is shown in FIG. 3.

Preferably, the ID is set to a combination of a product serial number, a password, information regarding a product operating system, and other information based on the customer's intent for use.

Here, the term 'DiSEqC' is an abbreviation for 'Digital Satellite Equipment Control', which is a standard defined by EUTELSAT, a European commercial satellite broadcast company.

For example, if the LNB ID ID2 and the receiver ID ID1 are the same, the LNB operation is turned on to provide the frequency-down-converted IF signal to the satellite receiver. On the contrary, if the LNB ID ID2 and the receiver ID ID1 are not the same, the LNB operation is turned off to provide no IF signal to the satellite receiver.

Preferably, the ID memory 120 of the present invention is adapted to store the LNB ID ID2 which is the same as the receiver ID ID1 stored in the satellite receiver. The reason why the LNB ID ID2 which is the same as the receiver ID ID1 stored in the satellite receiver is stored in the ID memory 120 is to allow the LNB to be normally operated when the satellite receiver is connected therewith and the LNB not to be operated when a different satellite receiver is connected therewith.

The switching controller 150 of the present invention outputs the switch-on signal to the switching device 170 if the two IDs ID1 and ID2 are determined to be the same by the processor 140, and the switch-off signal to the switching device 170 if the two IDs ID1 and ID2 are determined not to be the same by the processor 140.

The switching device 170 switches on or off the output of the IF signal from the frequency converter 110 in response to the switch-on signal or switch-off signal from the switching controller 150.

For one example, in the case where the switching device 170 is implemented with the power switch SW1, the power switch SW1 switches on or off the supply of the operating voltage from the voltage regulator 160 in response to the switch-on signal or switch-off signal from the switching controller 150.

That is, in response to the switch-on signal from the switching controller 150, the power switch SW1 is turned on to supply the operating voltage from the voltage regulator 160 to each part of the LNB. As a result, the frequency converter 110 of the LNB of the present invention is normally operated.

On the contrary, in response to the switch-off signal from the switching controller 150, the power switch SW1 is turned off to block the supply of the operating voltage from the voltage regulator 160. As a result, the frequency converter 110 of the LNB of the present invention is not operated.

For another example, in the case where the switching device 170 is implemented with the signal switch SW2, the signal switch SW2 is connected to the output terminal of the frequency converter 110 to switch on or off the output of the IF signal from the frequency converter 110 in response to the switch-on signal or switch-off signal from the switching controller 150.

Namely, in response to the switch-on signal from the switching controller 150, the signal switch SW2 is turned on to transfer the IF signal from the frequency converter 110 to the satellite receiver.

On the contrary, in response to the switch-off signal from the switching controller 150, the signal switch SW2 is turned off to block the output of the IF signal from the frequency converter 110. As a result, the LNB of the present invention outputs no IF signal to the satellite receiver.

For yet another example, in the case where the switching device 170 is implemented with the power switch SW1 and signal switch SW2, the power switch SW1 switches on or off the supply of the operating voltage from the voltage regulator 160 in response to the switch-on signal or switch-off signal from the switching controller 150. At the same time, the signal switch SW2 is connected to the output terminal of the frequency converter 110 to switch on or off the output of the IF signal from the frequency converter 110 in response to the switch-on signal or switch-off signal from the switching controller 150.

Meanwhile, the frequency converter 110 down-converts the frequency of the satellite signal from the satellite antenna ANT to the frequency processable by the satellite receiver and outputs the resulting IF signal. In detail, in the frequency converter 110, the low-noise amplifier 111 low-noise amplifies the satellite signal from the satellite antenna ANT and outputs the low-noise amplified satellite signal to the mixer 113. The mixer 113 mixes the frequency of the satellite signal from the low-noise amplifier 111 with the oscillation frequency from the oscillator 112 to down-convert it to the frequency processable by the satellite receiver, and outputs the resulting IF signal to the IF amplifier 114. Then, the IF amplifier 114 amplifies the IF signal from the mixer 113 at the predetermined gain.

As described above, according to the present invention, the operation or non-operation of the frequency converter 110 can be selected according to whether the operating voltage from the voltage regulator 160 is supplied by the power switch SW1. Further, the provision or non-provision of the output signal from the frequency converter 110 can be selected by the signal switch SW2.

Therefore, only when the LNB ID is the same as the receiver ID, the LNB of the present invention transmits the IF signal to the satellite receiver connected therewith, thereby making it possible to protect a developer and seller of the LNB and/or satellite receiver from duplication of an ID card, etc.

As apparent from the above description, the present invention provides an intelligent low-noise block down-converter (LNB) which is applied to a satellite broadcast receiving system. The intelligent LNB is implemented to, only when an LNB ID contained therein is the same as an ID of a satellite receiver connected therewith, provide a down-converted signal to the satellite receiver. Therefore, it is possible to more securely prevent an ID card of the satellite receiver and/or a pay broadcast program from being duplicated.

Furthermore, a satellite broadcast manager can efficiently manage the LNB and the satellite receiver from selling to maintenance thereof using the LNB ID of the LNB. In particular, satellite broadcast companies can promote increased profits owing to the prevention of illegal use of the LNB and the satellite receiver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An intelligent low-noise block down-converter (LNB) connected between a satellite antenna and a satellite receiver, comprising:

frequency conversion means for down-converting the frequency of a satellite signal from the satellite antenna to a intermediate frequency (IF) signal processable by the satellite receiver;

a voltage regulator configured to generate an operating voltage on the basis of a voltage from the satellite receiver and supplying generated voltage to the frequency converter;

an identification (ID) memory configured to store an LNB ID that is the same as a receiver ID stored in the satellite receiver;

an ID receiver configured to receive the receiver ID from the satellite receiver;

a processor configured to compare the LNB ID stored in the ID memory with the receiver ID received by the ID receiver to determine whether the two IDs are the same;

a switching controller configured to output a switch-on signal if the LNB ID and the receiver ID are determined to be the same by the processor, and a switch-off signal if the LNB ID and the receiver ID are determined not to be the same by the processor; and a switching means for switching on or off the output of the IF signal from the frequency conversion means in response to the switch-on signal or switch-off signal from the switching controller;

wherein the switching means includes:

a power switch connected to an output terminal of the voltage regulator, the power switch configured to switch on or off the supply of the operating voltage from the voltage regulator in response to the switch-on signal or switch-off signal from the switching controller; and a signal switch connected to an output terminal of the frequency conversion means, the signal switch configured to switch on or off the output of the IF signal from the frequency conversion means in response to the switch-on signal or switch-off signal from the switching controller.

2. The intelligent LNB as set forth in claim 1, wherein the frequency conversion means includes:

a low-noise amplifier configured to provide low-noise amplification of the satellite signal from the satellite antenna;

an oscillator configured to generate a predetermined oscillation frequency;

a mixer configured to mix the frequency of the satellite signal low-noise amplified by the low-noise amplifier with the oscillation frequency from the oscillator to down-convert it to the frequency processable by the satellite receiver, and outputting the resulting IF signal; and an IF amplifier configured to amplify the IF signal from the mixer at a predetermined gain.

3. The intelligent LNB as set forth in claim 1, further comprises a means for storing the receiver ID.

* * * * *